Figure 1:
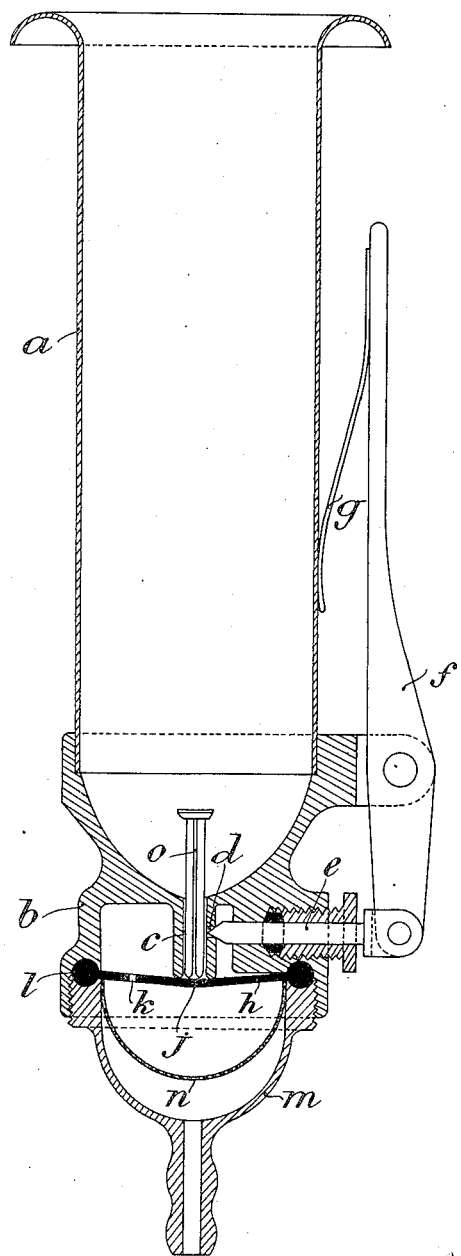

J. HENRICHSEN & C. J. HEMMINGSEN.
MILKING APPLIANCE.
APPLICATION FILED DEC. 11, 1908.

938,857.

Patented Nov. 2, 1909.
2 SHEETS—SHEET 1.

WITNESSES:

INVENTORS
Jacob Henrichsen
Carl Johannis Hemmingsen.
BY
ATTORNEYS.

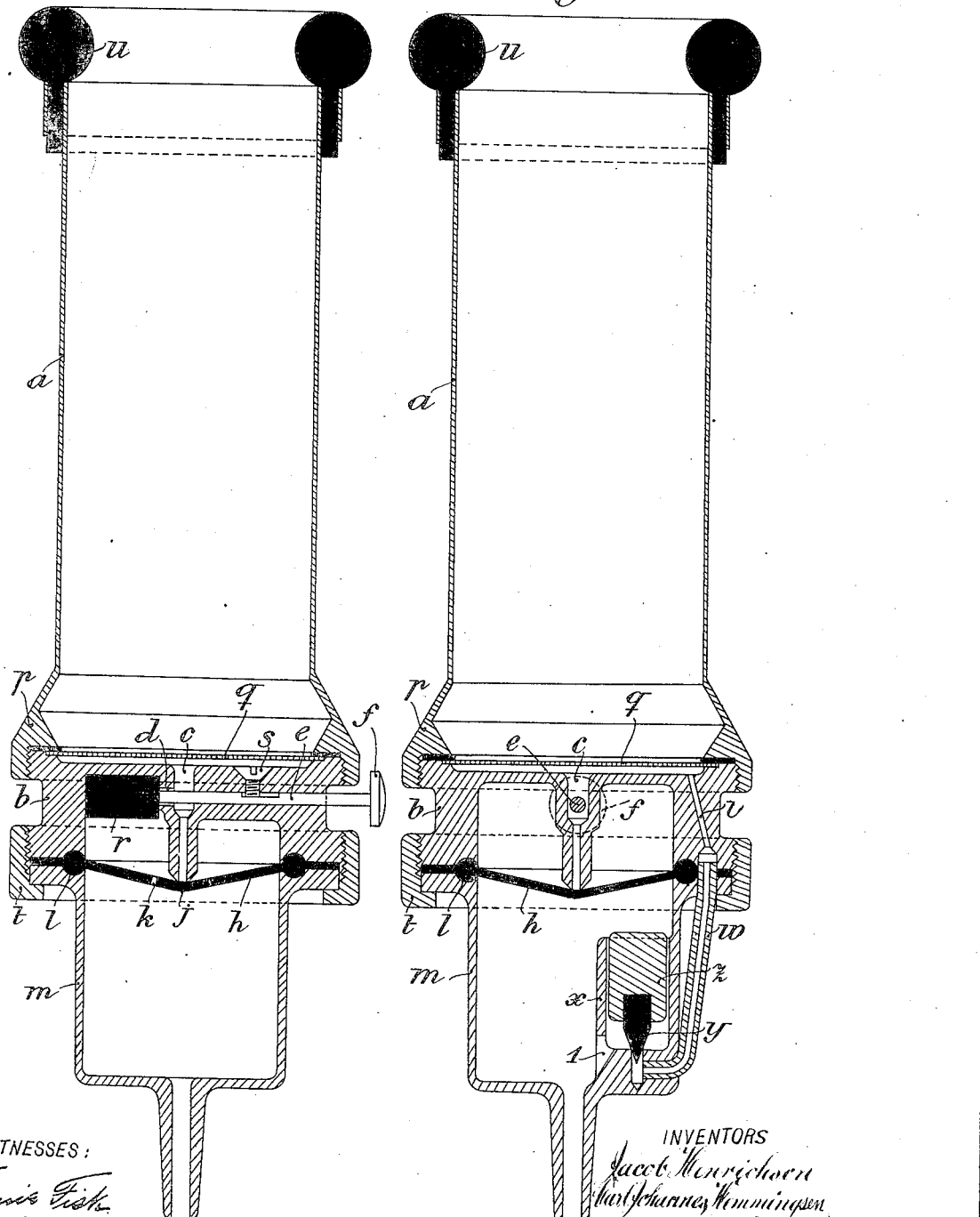

UNITED STATES PATENT OFFICE.

JACOB HENRICHSEN AND CARL JOHANNES HEMMINGSEN, OF COPENHAGEN, DENMARK.

MILKING APPLIANCE.

938,857.  Specification of Letters Patent.  Patented Nov. 2, 1909.

Application filed December 11, 1908. Serial No. 466,932.

*To all whom it may concern:*

Be it known that we, JACOB HENRICHSEN, of 21 Loengangsstraede, Copenhagen, Denmark, and CARL JOHANNES HEMMINGSEN, of 10 Enghavevej, Copenhagen, Denmark, have invented new and useful Improvements in Milking Appliances, of which the following is a specification.

This invention has reference to appliances of the type in which the milking is effected by suction.

The main novelty in a milking appliance constructed according to this invention consists in the connection between the suction pipe and the sucking cup being effected through a fine aperture or conduit arranged in or alongside a diaphragm, which separates the suction pipe from the sucking cup.

Owing to its own elasticity, or under the influence of a spring or the like, the said separating member is caused to normally bear against and thereby close the outlet or suction aperture of the sucking cup with a certain pressure so that normally the suction cannot be transmitted from the suction pipe to the sucking cup, but whenever such member is removed from the outlet aperture by actuation of an external member, or when a suitably arranged valve is opened, the suction action will extend to the sucking cup through the fine aperture before mentioned.

When the milk begins to flow from the sucking cup through the fine aperture the separating member will, owing to the pressure of the milk and the relatively slow passage thereof through the aperture, and the consequently relative increase of the suction action below the separating member, be automatically held removed from the outlet aperture so that it will be then no longer necessary to maintain, from the outside, the opening effected for starting. The suction action for milking continues as long as milk is flowing through the fine aperture, and whenever the milk ceases to flow the aperture will merely form a passage for the air in the sucking cup, and as this air is able to equalize the difference in pressure on both sides of the separating member quicker than milk the member will again be moved by its own tension or its spring or the like, in a direction to close the outlet aperture, and the teat to which the sucking cup is applied will thereupon be no longer exposed to sucking action.

An appliance constructed as described can be used by itself or two or four of them may be combined into a group.

The drawing shows two forms of construction of the appliance, in which the separating member is a diaphragm provided itself with the fine hole while the starting aperture is controlled by a valve independent of the diaphragm.

Figure 1 shows a vertical section through the one form of construction, and Figs. 2 and 3 show two vertical sections at right angle to each other, of the second form of construction.

$a$ Fig. 1 is the sucking cup mounted in a cast metal piece $b$ which is formed with an outlet aperture or channel $c$.

$d$ is a lateral opening communicating with the discharge aperture or channel $c$ and which is controlled by a starting-valve $e$ connected to an external handle $f$ or an operating button or the like, a spring $g$ being provided for normally keeping the valve $e$ closed.

$h$ is a flexible diaphragm, which may be made of india rubber, bearing against the outlet $c$ and which to one side of the part thereof which closes such outlet (the middle part in the example illustrated) is formed with a small hole $k$, say a hole of one half a millimeter in diameter for instance.

The marginal portion or rim of the diaphragm is formed as a ring $l$ and is fastened between the piece $b$ and a connecting piece $m$ for the suction pipe. The parts $b$ and $m$ are connected together by a screw-thread as shown, or a bayonet joint connection, or the like.

The part $m$ may be fitted with a perforated guard $n$ to limit the expansion of the diaphragm $h$ and minimize the danger of breakage. As another and additional guard against accidents the outlet channel $c$ may be provided with a valve $o$ the stem of which rests upon the diaphragm so that whenever the diaphragm is pressed too far down or breaks the channel is closed automatically by the valve.

During the expansion of the diaphragm the hole $k$ will also expand somewhat which is one of the advantages of forming the hole in the diaphragm proper.

In the form of construction shown in Figs. 2 and 3 the lower part $p$ of the sucking cup $a$ is provided with a screw-thread, and between the parts $b$ and $p$ is inserted a strainer $q$. The starting valve consists of a rod $e$ provided at one end with a button $f$ and with the other end actuating an india-rubber valve-body $r$ inserted between the side-opening $d$ and the wall part $b$, so that normally the said valve will close the side-opening. But when the button $f$ is pressed the end of the rod $e$ that projects through the channel $c$ and the opening $d$ will push the valve $r$ into position to uncover this opening. $s$ is a screw limiting the movement of the rod $e$. In this form of construction the diaphragm $h$ is fastened between the parts $b$ and $m$ by means of a nut $t$ screwed onto the part $b$.

$u$ is an india-rubber ring arranged at the top of the sucking cup $a$, and its object is to make a tight fit between the teat and the sucking cup so as to prevent this latter from falling down. For making still more sure that the sucking cup shall not loosen itself too soon from the teat, the arrangement shown in Fig. 3 may be used. This arrangement consists of a channel $v$ in the part $b$ and a pipe $w$ communicating with the said channel $v$. The upper end of the pipe $w$ projects through a corresponding hole in that part of the diaphragm $h$ that is outside the ring $l$, and is pressed tightly against the channel $v$ when the parts $b$, $m$ and $t$ are screwed together. The lower end of the pipe $w$ communicates with the interior of the casing $x$ in which is arranged a valve $y$ that is either influenced by a spring or loaded. In the construction shown the valve $y$ is an india-rubber cone upon which rests a weight $z$ capable of moving freely inside the casing $x$ within certain limits, so that the valve only gets a small lift. $l$ is an outlet from the interior of the casing $x$. The valve $y$ being loaded it will remain closed as long as the difference between the vacuum in the sucking cup $a$ and the vacuum in the suction conduit or the part $m$ keeps within a certain limit. This is generally the case as long as the outlet $c$ is open. But, when the quantity of milk coming from the teat is so large that the fine opening $k$ is too small for allowing the milk to pass through quickly enough, or when on the other hand the flow of milk from the teat stops, at which moment the diaphragm $h$ will contract and close the outlet $c$, the vacuum in the sucking cup $a$ will quickly decrease, partly on account of leakage and partly on account of the presence of milk in the sucking cup. The unaltered high vacuum inside the part $m$ will then at a certain moment cause the valve $y$, $z$ to open so as to allow the milk that may be present in the sucking cup to be sucked out through the by-pass channel $v$, the by-pass pipe $w$ and the outlet $l$, whereby the vacuum inside the sucking cup will again rise to a certain fixed limit before the cup can fall off from the teat. If milk should constantly drip from the teat the aforementioned process may be repeated many times.

What we claim as our invention, and desire to secure by Letters Patent is:—

1. In a milking appliance, the combination of a suction-cup having a passage leading to the suction-pipe, and a flexible diaphragm to close said passage automatically when the flow of milk ceases.

2. In a milking appliance, the combination of a suction-cup to be applied to the teat and having a milk-passage leading to the suction-pipe, and a flexible diaphragm which normally closes said passage, but which permits the passage of the milk.

3. In a milking appliance, the combination of a suction-cup having a milk-passage, a perforated diaphragm normally closing said passage, and means to move said diaphragm away from the passage to start the flow of milk through the same.

4. In a milking appliance, the combination of a suction-cup having a milk-passage, a perforated diaphragm normally closing said passage, and a valve by which the pressure on the diaphragm toward the side of the suction-cup may be increased in order to move the diaphragm away from the milk-passage.

5. In a milking appliance, the combination of a suction-cup having a milk-passage, a perforated diaphragm normally closing said passage, and manually operated means by which said diaphragm may be moved away from the milk-passage to start the flow of milk, the diaphragm being so adjusted that when the milk ceases to flow through the milk-passage the diaphragm will return to its seat and close the latter.

6. In a milking appliance, the combination of a suction-cup having a milk-passage, a diaphragm to close said passage, and a by-pass device by which the suction in the suction-cup and suction-pipe is automatically equalized.

7. In a milking appliance, the combination of a suction-cup having a milk-passage leading to the suction-pipe, a diaphragm to close said passage, a by-pass channel leading from one side of the diaphragm to the other, and a suction-operated valve to control said by-pass channel.

In testimony, that we claim the foregoing as our invention, we have signed our names in presence of two subscribing witnesses.

JACOB HENRICHSEN.
CARL JOHANNES HEMMINGSEN

Witnesses:
P. HOFMAN BANG,
ERNEST BOUTARD.